Sept. 5, 1950 L. B. WILSON 2,520,990

NEGATIVE RESISTANCE DEVICE

Filed March 1, 1947 2 Sheets-Sheet 1

INVENTOR
LLOYD B. WILSON
BY
Paul B. Hunter
ATTORNEY

NEGATIVE RESISTANCE DEVICE

INVENTOR
LLOYD B. WILSON
BY
Paul B. Hunter,
ATTORNEY

Patented Sept. 5, 1950 | 2,520,990

UNITED STATES PATENT OFFICE 2,520,990

NEGATIVE RESISTANCE DEVICE

Lloyd B. Wilson, Garden City, N. Y., assignor to The Sperry Corporation, a corporation of Delaware Application March 1, 1947, Serial No. 731,812

15 Claims. (Cl. 250—36)

The present invention relates generally to the art of electron discharge devices and circuits therefor and is particularly directed toward novel negative resistance devices of the two-terminal type and novel uses therefor.

A two-terminal negative resistance device, as generally understood, is a device having two terminals whose current-voltage characteristic has a negative slope; that is, current decreases for an increase in voltage, and vice versa. Such negative resistances have numerous applications in electrical circuits, one of which is discussed, for example, in the Radio Engineers Handbook by F. E. Terman, (McGraw Hill Book Co., 1943) at page 915. It would be desirable to have such devices substantially independent of frequency over a wide range. It would also be desirable to have the value of such negative resistance readily adjustable.

Accordingly, it is an object of the present invention to provide a novel negative resistance device.

Another object is to provide a two-terminal negative resistance device that is substantially independent of frequency over a wide range.

Yet another object is to provide a negative resistance device having a readily adjustable value of negative resistance.

A further object is to provide novel uses for negative resistance.

The invention also relates to the novel features or principles of the instrumentalities described herein, whether or not such are used for the stated objects, or in the stated fields or combinations.

Figure 1:
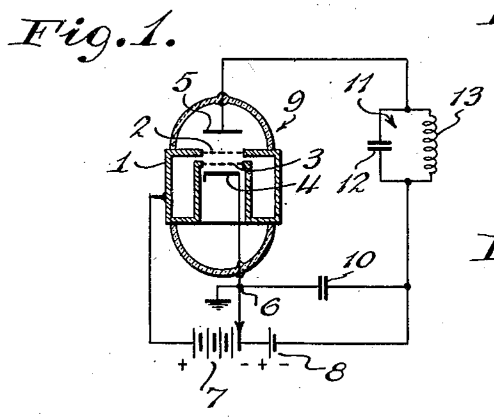
Fig. 1 is a schematic circuit diagram of one form of the present invention showing the novel negative resistance device and utilization means therefor.

Referring to Fig. 1, the negative resistance device 9 of the present invention includes a reentrant cavity resonator 1 having a pair of adjoining electron-permeable grids 2 and 3. Opposite grid 3 is a cathode 4 adapted to produce a supply of electrons. Opposite grid 2 is reflector electrode 5. The construction of this electron discharge device 9 is similar to that of the device known as a "reflex klystron" and shown in Fig. 2 of United States Patent No. 2,250,511. One respect in which it differs is the absence of terminal leads for the resonator 1, for coupling microwave energy to or from the resonator 1. The conductive interior wall of the resonator 1 is unbroken except for the electron-permeable grids 2 and 3. The absence of terminal leads markedly simplifies the construction of the device 9. Cathode 4 may be grounded as at 6. A unidirectional voltage source 7 is provided with its positive terminal connected to resonator 1 and its adjustable negative terminal tap grounded at 6. By this connection, grids 2 and 3 are maintained positive with respect to the cathode 4. A unidirectional voltage source 8 is provided with its negative terminal connected to reflector 5 through a tank circuit such as the anti-resonant circuit 11 comprising condenser 12 and coil 13. By-pass condenser 10 is provided across source 8. The positive terminal of source 8 is connected to cathode 4. However, the operation of the device is not restricted to the reflector 5 being negative with respect to the cathode 4, since the device may also operate with the reflector 5 positive with respect to the cathode 4.

Figures 2A, 2B:
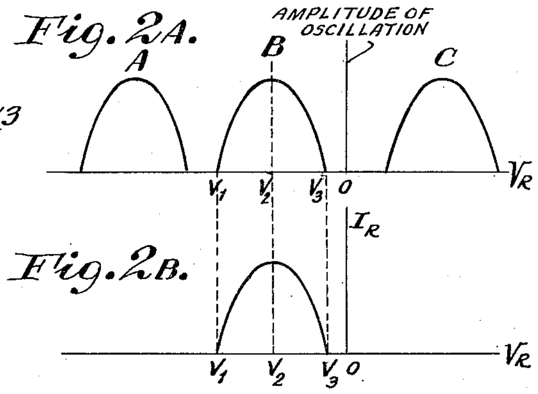
Figs. 2A and 2B are graphs useful in explaining the operation of the device of Fig. 1.

For a given potential difference between resonator 1 and cathode 4, and for a given electron current from cathode 4, neither of which is critical in the present invention, high-frequency oscillations of substantially the same frequency as the resonant frequency of resonator 1 will be produced in resonator 1 for certain discontinuous ranges of voltages applied to reflector 5. In Fig. 2A, the amplitude of oscillation within resonator 1 is plotted against the voltage $V_R$ of reflector 5 with respect to cathode 4. It can be seen that the amplitude of oscillation varies with reflector voltage within each of the discontinuous ranges of the reflector voltage $V_R$, as shown by curves A, B and C, each of which represents one "mode" of oscillation. The amplitude of oscillations will instantaneously follow reflector voltage variations over the entire range from very slow variations to high frequency variations, being limited substantially only by the Q of resonator 1.

Considering for a moment curve B, representing the variation in amplitude of oscillation over the range of reflector voltage from $V_1$ to $V_3$, it will be seen that, throughout this range, the reflector 5 is negative with respect to cathode. For such negative values of reflector voltage, in the absence of oscillations in resonator 1, substantially all the electrons passing through grid 2 toward the reflector 5 are reversed by the reflector 5 before striking the reflector 5. Accordingly, under these conditions substantially no current would flow in the reflector electrode circuit.

When there are oscillations within the resonator, the beam of electrons from the cathode 4 is velocity-modulated by the electric field between grids 2 and 3, the electrons being accelerated and decelerated during alternate half cycles of the oscillations in resonator 1. When the reflector 5 is only slightly negative with respect to cathode, the amount of acceleration imparted to the electrons during the accelerating half cycles is sufficient to cause many of the electrons so accelerated to impinge upon and be collected by the reflector 5. Accordingly, current then flows in the reflector circuit. The amount of current flow in the reflector circuit depends upon the amount of acceleration, and, therefore, upon the amplitude of oscillation. The variation of reflector current with reflector voltage is therefore as shown in Fig. 2B, where only that portion of the curve corresponding to mode B is shown.

Let it be assumed, for example, that, at a given instant of time, the potential on the reflector is at $V_2$, which is the value of reflector voltage in mode B at which maximum amplitude of oscillations is present in the resonator 1, as shown in Fig. 2A. At this reflector voltage value, maximum current flows in the reflector circuit, as shown in Fig. 2B. If a positive increment of reflector potential is impressed upon the reflector 5, the amplitude of oscillation within the resonator 1 will decrease, as shown by the portion of the curve B between $V_2$ and $V_3$. The decrease in amplitude of oscillations will decrease the maximum values of acceleration and deceleration imparted to the electron beam. Accordingly, the number of electrons striking the reflector will decrease, resulting in a decrease of current in the reflector circuit in response to an increase in voltage, as shown in Fig. 2B. Thus, a true negative resistance characteristic is exhibited in the reflector circuit.

Because of this negative resistance, oscillations will be set up in the anti-resonant circuit 11 at a frequency substantially determined by the inductance and capacitance values of the coil 13 and condenser 12. It can be seen that oscillations are started in the anti-resonant circuit 11 by any transient effect that produces a change in the amplitude of oscillations within resonator 1. This change results in a change in the peak values of acceleration and deceleration imparted to the electron beam by the oscillations within resonator 1, and, therefore, in a change in current flow in the reflector circuit. This may be considered to be a detecting action by the reflector and its associated circuitry, since the reflector current corresponds to and hence "detects" the amplitude of resonator oscillations. The change in current flow is accompanied by a change in potential difference between reflector 5 and resonator 1 and, therefore, by a change in the average transit time of the electrons in the space between the resonator 1 and reflector 5. These changes are augmented, i. e. are increased in the same sense, because of the negative resistance character of the electron discharge device 9 at the operating point on the negative resistance portion of the mode, which is anywhere between $V_2$ and $V_3$ in Figs. 2A and 2B. Consider the potential difference between reflector 5 and resonator 1. It is dependent upon current flow in the reflector circuit and upon the current flow within the anti-resonant circuit 11 caused by the change in reflector current. The change in the potential difference that accompanies the change in reflector current is augmented to the point at which there is no further change because of the character of the mode of operation of the electron discharge device 9 and because of the parameters of the circuit. At that point a change of opposite sense in potential difference is initiated and is augmented to the point at which, again because of the character of the mode of operation of electron discharge device 9 and because of the parameters of the circuit, a change of opposite sense in voltage difference is initiated. The oscillations thus started will be sustained because of the energy delivered to the anti-resonant circuit 11 by the negative resistance device. These oscillations may then be utilized in any desired manner, e. g., a signal source for test and measurement purposes. The variations in the reflector voltage caused by these oscillations will also modulate the amplitude and frequency of the oscillations within the resonator.

The operation of the device is not limited to the particular mode shown, but may be operated in any of the modes in which the reflector draws current when oscillations are present in the resonator, whether or not the reflector draws current when there are no oscillations.

The operation of the device may be looked at from another point of view. In electron-discharge devices of the present type, oscillations are produced in the resonator by the conversion of the uniform-intensity velocity-modulated electron stream, (flowing from grid 2 toward reflector 5) into a varying-intensity or bunched electron stream returning to grid 2 by action of the reflector 5. In the above description of the operation of the device of Fig. 1, it was assumed that the potential difference between cathode and resonator (i. e., the electron-accelerating voltage) and the cathode current were constant. The effect of a positive voltage increment on the reflector, when the instantaneous value of the reflector voltage is between values $V_2$ and $V_3$ of curve B of Fig. 2B (which may be termed "the negative resistance portion of the mode") is to increase the transit time of the electrons in the space between the reflector 5 and resonator 1. This changes the phase of the high frequency current component of the returning beam, relative to the oscillations in the resonator, and thereby decreases the amplitude of oscillations in the resonator. This decreases the current to the reflector and, since the beam current is constant, the current formed by the electrons collected by the walls of the resonator 1 and returned to the battery 7 is correspondingly increased. Accordingly, on the negative resistance portion of the mode, an increase in transit time of electrons in the reflector space due to a positive increment in reflector voltage increases the current flow in the resonator circuit and decreases the current flow in the reflector circuit. Similarly, a decrease in transit time of the electrons in the reflector space due to a negative increment in reflector voltage decreases the current flow in between the resonator 1 and battery 7 and increases the current flow in the reflector circuit.

Since the anti-resonant circuit 11 is excited to oscillation at its own frequency, the reflector voltage is correspondingly and periodically varied at that frequency. It is therefore apparent that the average transit time of the electrons in the reflector space will also be modulated at this frequency, which is substantially determined by the circuit constants of the anti-resonant circuit 11. Similarly, the amplitude of oscillation of resonator 1 is correspondingly modulated at that frequency. The modulated oscillations within the resonator 1 may also be utilized where desired.

Although the above described embodiment of the present invention includes anti-resonant circuit 11 connected so as to utilize the negative resistance of the device to modulate the oscillations within the resonator, it is not intended that the uses of this characteristic of the device be restricted to modulation of the oscillations within resonator 1, nor is the invention restricted to the use of an anti-resonant circuit such as 11. The negative resistance characteristic of the device exists between the reflector terminal and some other terminal which may be called a "reference terminal." Such a reference terminal may be the cathode as in Fig. 1 or Fig. 3, or the resonator as in Fig. 4.

Figure 3:
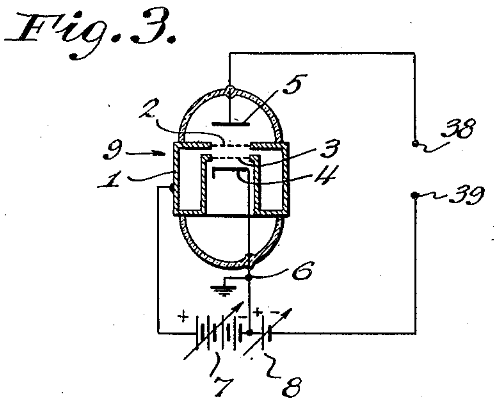
Fig. 3 is a schematic circuit diagram of one form of the negative resistance device per se.
Figure 4:
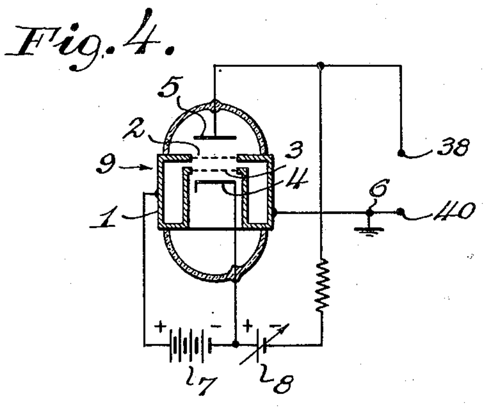
Fig. 4 is a schematic circuit diagram of another form of the negative resistance device per se.

Thus, if it is desired to utilize the two-terminal negative resistance of the present invention in conjunction with other apparatus, the latter may be connected as shown in Fig. 3, between terminal 38 coupled to reflector 5 and a reference terminal 39 coupled to negative side of source 8. Inasmuch as the potential of the resonator is substantially fixed with respect to the cathode potential, terminal 40 coupled to resonator 1, as shown in Fig. 4 may be utilized in place of terminal 39.

Figure 5:
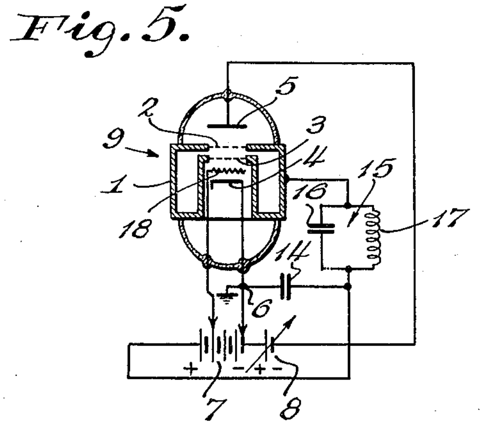
Fig. 5 is a schematic circuit diagram of still another form of the invention showing another two-terminal negative resistanc device and novel utilization means therefor.

Fig. 5 is a schematic diagram of another form of the invention in which the resonator and cathode are directly connected to the two terminals across which appears the negative resistance. The apparatus includes electron discharge device 9 comprising resonator 1, grids 2 and 3, cathode 4 and reflector 5 substantially as in Fig. 1. Voltage source 7 is provided with its negative terminal connected to cathode 4 and its positive terminal connected to resonator 1 through an anti-resonant circuit 15 comprising condenser 16 and coil 17. The positive terminal of voltage source 8 is connected to cathode 4 and its negative terminal connected to reflector 5, although, as discussed above, reflector 5 may be positive relative to cathode 4 under proper conditions. By-pass condenser 14 is provided across source 7. A control grid 18 is inserted between cathode 4 and resonator 1, and is maintained at a fixed potential positive with respect to cathode 4 in order that the beam current may be kept substantially independent of variations of potential of resonator 1.

As stated above, when the device is operating in the negative resistance portion of its oscillation mode (as between $V_2$ and $V_3$ in Fig. 2A), an increase in transit time results in a decrease in amplitude of resonator oscillation, effecting a decrease in reflector current and an increase in current to the resonator. Also, a decrease in transit time results in an increase in amplitude of oscillation, effecting an increase in reflector current and a decrease in current to the resonator. In the device of Fig. 5, a negative increment of voltage between the resonator 1 and cathode 4 decreases the electron acceleration voltage and increases the transit time, which decreases the resonator oscillation amplitude, and decreases reflector current. Since the beam current is constant, this negative increment of resonator potential with respect to the cathode therefore results in a positive increment of current to the resonator 1. Similarly, a positive increment of resonator potential produces a decrease in the transit time and, therefore, a negative increment of current to the resonator 1.

Thus a negative resistance characteristic exists between cathode and resonator, when operating in that portion of the mode in which an increase of transit time results in a decrease in amplitude of oscillation. Because of this negative resistance, oscillations will be set up in anti-resonant circuit 15 at a frequency substantially determined by the circuit constants of the coil 17 and condenser 16. The variations in acceleration voltage caused by these oscillations will then also modulate the oscillations within the resonator, and either or both the oscillations in circuit 15 or resonator 1 may be used as desired. Here again, any other circuit to which it is desirable to couple the present negative resistance may be substituted for circuit 15, as in Figs. 3 and 4.

Figure 6:
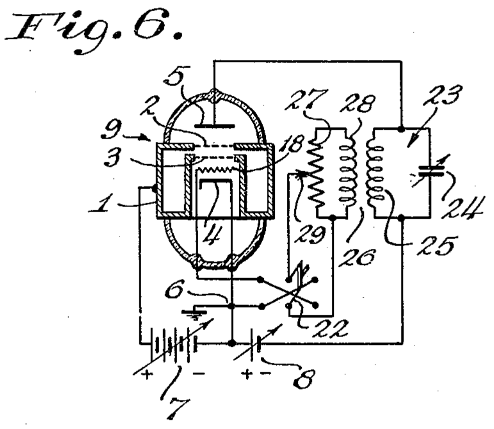
Fig. 6 is a schematic circuit diagram of another form of the invention utilizing the combination of two effects to produce a readily adjustable negative resistance.

Fig. 6 is a schematic drawing of an oscillator utilizing a modified form of the novel negative resistance characteristic of the present invention in which the value of negative resistance is readily adjusted by proper control of the value of beam current. The apparatus includes reentrant resonator 1, grids 2 and 3, cathode 4 and reflector 5 as in Fig. 1. Control grid 18 controls the value of beam current from cathode 4. Voltage source 7 is provided with its negative terminal connected to cathode 4 and its positive terminal connected to resonator 1. Voltage source 8 is provided with its positive terminal connected to cathode 4, and its negative terminal connected to reflector 5 through the anti-resonant circuit 23 comprising condenser 24 and primary winding 25 of transformer 26. A resistor 27 having a variable tap 29 is connected across the secondary winding 28 of transformer 26. One end of secondary winding 28 is connected by reversing switch 22 to cathode 4, and control grid 18 is connected to variable tap 29. The voltage derived from the secondary winding 28 and impressed upon control grid 18 is therefore readily adjustable by means of variable tap 29.

If the apparatus is adjusted to operate in the negative resistance portion of the mode, as in Fig. 1, oscillations will be set up in the anti-resonant circuit 23 in the manner described above. The connection of the windings of transformer 26 is made such that variations in the potential of control grid 18 are in phase coincidence with variations in potential of reflector 5, so that an increase in reflector potential (which decreases the current to the reflector) increases the potential of control grid 18. An increase of the potential of the control grid 18 increases the beam current from cathode 4 and, therefore, tends to increase the current to the reflector 5. It can be seen, therefore, that the tendency of a positive increment of reflector potential to decrease the current to the reflector 5 is modified by the tendency of the positive of control grid voltage to increase the current to the reflector.

The magnitude of the negative resistance of a device is considered to be a direct function of the magnitude of the change in voltage required to produce a given change of opposite sense in the current. Thus, if variations in control grid potential are in phase with variations in reflector potential, the negative resistance of the apparatus is increased, and to a degree determined, in part, by the setting of the variable tap 29.

If the connection of the winding 28 of the transformer 26 to grid 18 is reversed, so that variations in potential of control grid 18 are 180° out of phase with respect to variations in potential of reflector 5, an increase in reflector potential decreases current flow to the reflector and decreases the potential on control grid 18. This decrease in control grid potential further decreases the current flow to the reflector and to a degree determined, in part, by the setting of tap 29. Thus, the negative resistance is decreased by an amount determined, in part, by the setting of the variable tap 29. The desired connection between transformer 26 and grid 18 is obtained by the reversing switch 22.

Figure 7:
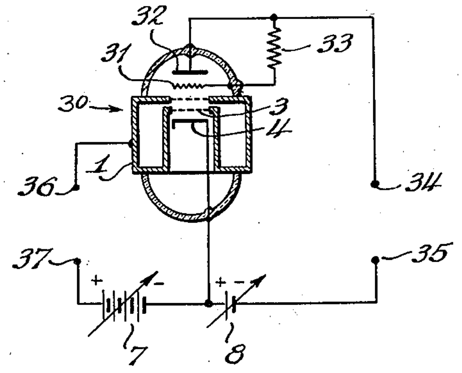
Fig. 7 is a schematic circuit diagram of a two-terminal negative resistance device in which the effects of secondary emission are minimized.

Fig. 7 is a schematic diagram of a negative resistance device that minimizes the effect of secondary emission from the reflector upon the value of the negative resistance produced. Electron-discharge device 30 comprises reentrant resonator 1, cathode 4, reflector grid 31 and collector plate 32. Reflector grid 31 is connected to collector plate 32 by resistor 33. Variations in potential of reflector grid 31 have the same effect upon the amplitude of oscillations within resonator 1 as do similar variations of the reflector electrodes in Figs. 1, 3, 4, 5 and 6. Because of its construction as a grid, however, most of the electrons which reach electrode 31 pass through it and strike the collector plate 32. Secondary electrons emitted from the collector plate will return to it because of the potential difference between the reflector grid 31 and collector plate 32 caused by the current through resistor 33. Utilization means such as in Figs. 1, 3, 4, 5 and 6 may be connected between terminal 34 coupled to collector plate 32 and terminal 35 coupled to the negative terminal of voltage source 8 whose positive terminal is connected to cathode 4 as in prior figures. If desired, the utilization means may be connected between terminal 36 coupled to resonator 1 and terminal 37 coupled to positive terminal of the voltage source 7, whose negative terminal is connected to cathode 4 as before.

Figure 8:
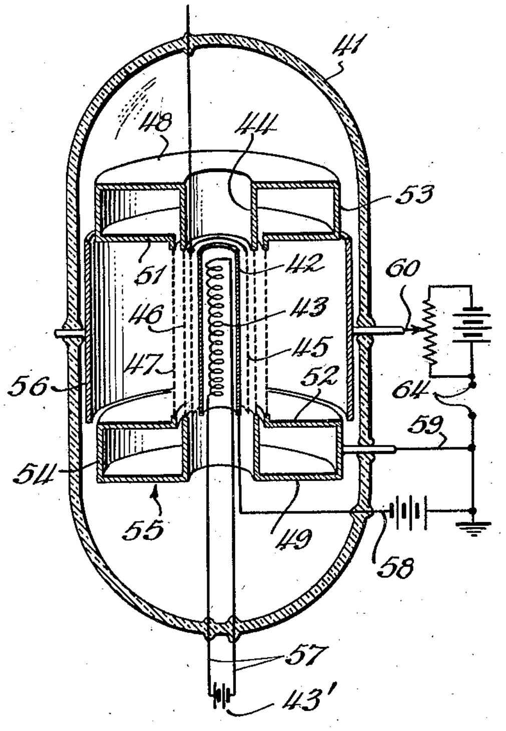
Fig. 8 shows an electron discharge device suitable for use in various circuits of the present invention.

A very simple structure for the electron-discharge apparatus of the above figures is shown in Fig. 8, and comprises a suitable evacuated envelope 41, such as of glass, in which the necessary electrodes are mounted in the conventional manner. Thus, within envelope 41 is a cylindrical cathode 42 containing a conventional heater element 43 adapted to be heated by a flow of electrical current therethrough, as from a battery 43′. Such heating raises the temperature of cathode 42 and permits it to emit electrons. Closely surrounding and concentric with the cathode 42 is a cylindrical control grid 45, which in turn is surrounded by a cylindrical conductive member 44, the portion of which opposite cathode 42 and grid 45 is made electron-permeable to serve as a grid 46. Concentric with and surrounding grid 46 is a further cylindrical grid 47. Fixed at each end of the cylindrical member 44 are flat circular conductive plates 48 and 49 disposed in planes perpendicular to the axis of the device. Similarly fixed to the respective ends of the grid 47 are similar circular conductive plates 51 and 52 mounted parallel respectively to plates 48 and 49. Surrounding plates 48 and 51 and fixed to the edges thereof is a cylindrical conductive member 53. A similar cylindrical conductive member 54 connects plates 49 and 52. Grids 46 and 47, member 44, plate members 48, 49, 51 and 52 and cylindrical members 53 and 54 provide a cavity resonator 55 similar in function to resonator 1 of the above figures. Surrounding grid 47 and insulated from the cavity resonator is a cylindrical reflector electrode 56. Suitable terminal leads 57 are connected to the heater 43 and extend externally of the envelope. Similarly, cathode 42 is provided with an external lead 58, the resonator 55 is provided with an external lead 59, and the reflector 56 is provided with an external lead 60. Each of these leads is connected in the manner shown in any of the above figures. It will be understood that the electron stream in the device of Fig. 8 is directed radially outward from cathode 42 and, subsequently, is at least partially reflected radially inward by the reflector 56. By properly adjusting the reflector voltage $V_R$ the negative resistance will be produced between terminals 64, just as in the above figures. Any increase in voltage between terminals 64 produced by the external circuit connected thereto will produce a decrease in current, and vice versa, so that such an external circuit will have a true negative resistance connected thereto by terminals 64. It will be understood that other leads may be used as output terminals, as described above.

The device of Fig. 8 thereby provides an extremely simple easily fabricated device operable in the same manner as that described with respect to the above figures and useful as a negative resistance device. It will be understood that other forms of construction may be utilized in place of that shown in Fig. 8, so long as the essential elements discussed with respect to the above figures are present.

Since many changes could be made in the above constructions and many apparently widely different embodiments of this invention could be made without departure from the scope thereof, it is intended that all matter contained in the above description or shown in the accompanying drawings shall be interpreted as illustrative and not in a limiting sense.

What is claimed is:

1. High frequency apparatus comprising an oscillator including a source of electrons, a resonant member capable of containing electromagnetic waves, and means for controlling the amplitude of oscillation of said electromagnetic waves, and said oscillator being operated in that portion of its mode of oscillation in which an increase in potential on said amplitude-controlling means effects a decrease in amplitude of oscillation, whereby a negative resistance exists between two of the elements of said oscillator, and an output circuit coupled between said two elements.

2. High frequency apparatus comprising an oscillator including a source of electrons, a resonant member capable of containing electromagnetic waves, and means for controlling the amplitude of oscillation of said electromagnetic waves, and said oscillator being operated in that portion of its mode of oscillation in which an increase in potential on said amplitude-controlling means effects a decrease in amplitude of oscillation, whereby a negative resistance exists between two of the elements of said oscillator, and utilization means coupled to said negative resistance for modulating the amplitude of oscillations within said resonant member.

3. High frequency apparatus comprising an oscillator including means for producing a beam of electrons, means for density modulating the beam of electrons including means for modulating the velocity of the electrons and means defining a space wherein the velocity modulation is converted into density modulation; said oscillator also including means for controlling the transmit time of the electrons in said space, and detecting means comprising a circuit coupling the first and second-mentioned means for operating the oscillator in that portion of its mode of oscillation in which an increase in transit time effects an increase in the peak value of velocity modulation whereby a negative resistance is created between two elements of said oscillator.

4. High frequency apparatus comprising an oscillator including means for producing a beam of electrons, means for density modulating the beam of electrons including means for modulating the velocity of the electrons and means defining a space wherein the velocity modulation is converted into density modulation; said oscillator also including means for controlling the transit time of the electrons in said space, and means for operating the oscillator in that portion of its mode of oscillation in which an increase in transit time effects an increase in the peak value of velocity modulation whereby a negative resistance is created between two elements of said oscillator, and utilization means coupled to said negative resistance for modulating the transit time of the electrons in said space.

5. A negative resistance device comprising an oscillator including a cathode, a cavity resonator adapted to contain standing electromagnetic waves and a reflector electrode, means for operating the oscillator in that portion of its mode of oscillation in which the amount of reflected current is an inverse function of the amplitude of oscillation within the cavity resonator and an output circuit coupled between said reflector electrode and another element of said oscillator.

6. Ultra-high-frequency apparatus comprising an oscillator including means for producing an electron beam, means for controlling the value of said beam current, means for modulating the velocity of said electrons, and independent means for controlling the peak value of the velocity modulation imparted to the electrons; and means coupled to the two controlling means for varying the effect of a change in one by a change in the other.

7. High frequency apparatus comprising an electron discharge device including means for producing an electron beam, means for controlling the value of said beam current, means for velocity modulating said electron beam, and means for controlling the peak value of the velocity modulation of said current, said electron discharge device being operated in that portion of its characteristic in which a positive increment of potential on said peak value control means decreases the peak value of the velocity modulation; and means responsive to a change in one of said control means for effecting a change in the other.

8. High frequency apparatus comprising means for producing a beam of electrons; means for density modulating the electrons including means for velocity modulating the electrons and also including means defining a space to convert the velocity modulation into density modulation; independent means for controlling the average transit time of the electrons in the space; means for controlling the number of electrons from said source, and means responsive to a change in one control effect for varying the other control effect.

9. High frequency apparatus comprising means for producing a beam of electrons; means for density modulating the electrons including means for velocity modulating the electrons and also including means defining a space to convert the velocity modulation into density modulation; means for controlling the average transit time of the electrons in the space; means for controlling the number of electrons from said source, means for operating the electron discharge device in that portion of its characteristic in which a positive increment of potential on said transit time control means decreases peak value of velocity modulation imparted to the electrons, and means responsive to a change in one control effect for varying the other control effect.

10. High frequency apparatus comprising an oscillator including a cathode, a grid, a cavity resonator adapted to contain standing electromagnetic waves, a reflector spaced from said resonator, and a voltage source coupled to said reflector, the magnitude of the voltage applied to said reflector being such that the oscillator is operated in that portion of its characteristic in which an increase in transit time effects an increase of current to said reflector; and coupling means between the grid and reflector whereby the result of a change in the effect of one upon the amplitude of oscillations within the resonator is varied by a change in the other.

11. High frequency apparatus comprising an oscillator including a cathode, a grid, a cavity resonator capable of containing standing waves therein, and a reflector; means for operating the oscillator in that portion of its characteristic in which an increase in potential on said reflector effects a decrease in amplitude of oscillation within said resonator; and means coupled to the reflector and the grid and adapted to utilize the effect of a change in reflector potential upon the amplitude of oscillation to produce a change in beam current.

12. High frequency apparatus comprising an oscillator including a cathode, a grid, a cavity resonator capable of containing standing electromagnetic waves therein, a reflector, and a voltage source coupled to said reflector, the magnitude of voltage applied to said reflector being such that the oscillator is operated in that portion of its characteristic in which an increase in reflector potential results in a decrease in amplitude of oscillations within the resonator whereby a negative resistance characteristic appears; and circuit means coupled to the grid and to the reflector and adapted to utilize said negative resistance characteristic to sustain oscillations within the circuit.

13. High frequency apparatus comprising an oscillator including a cathode, a cavity resonator and a reflector, means for operating the oscillator in that region of its characteristic in which an increase in potential on the reflector decreases the current to said reflector, and a circuit comprising an inductance and a capacity coupled between the reflector and one of the other elements of said oscillator, whereby oscillations are set up in the circuit.

14. A two-terminal negative resistance device comprising an oscillator including a cathode, a cavity resonator and a reflector; a first terminal coupled to said reflector and adapted to be coupled to a utilization device requiring connection to a negative resistance; and another similar terminal for coupling to the utilization device coupled to the cathode of the oscillator, said oscillator being operated in that portion of its characteristic in which an increase in potential on said reflector decreases the current to said reflector.

15. Apparatus as in claim 14 including a control grid in said oscillator and coupling means between said reflector and said control grid.

LLOYD B. WILSON.

REFERENCES CITED

The following references are of record in the file of this patent:

UNITED STATES PATENTS

| Number | Name | Date |
| --- | --- | --- |
| 1,980,728 | Koch | Nov. 13, 1934 |
| 2,278,210 | Morton | Mar. 31, 1942 |
| 2,414,785 | Harrison | Jan. 21, 1947 |
| 2,414,843 | Varian et al. | Jan. 28, 1947 |

Certificate of Correction

Patent No. 2,520,990 September 5, 1950

LLOYD B. WILSON

It is hereby certified that error appears in the printed specification of the above numbered patent requiring correction as follows:

Column 7, line 1, after "positive" insert *increment*; column 9, line 17, for "transmit" read *transit*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*